Figure 1:
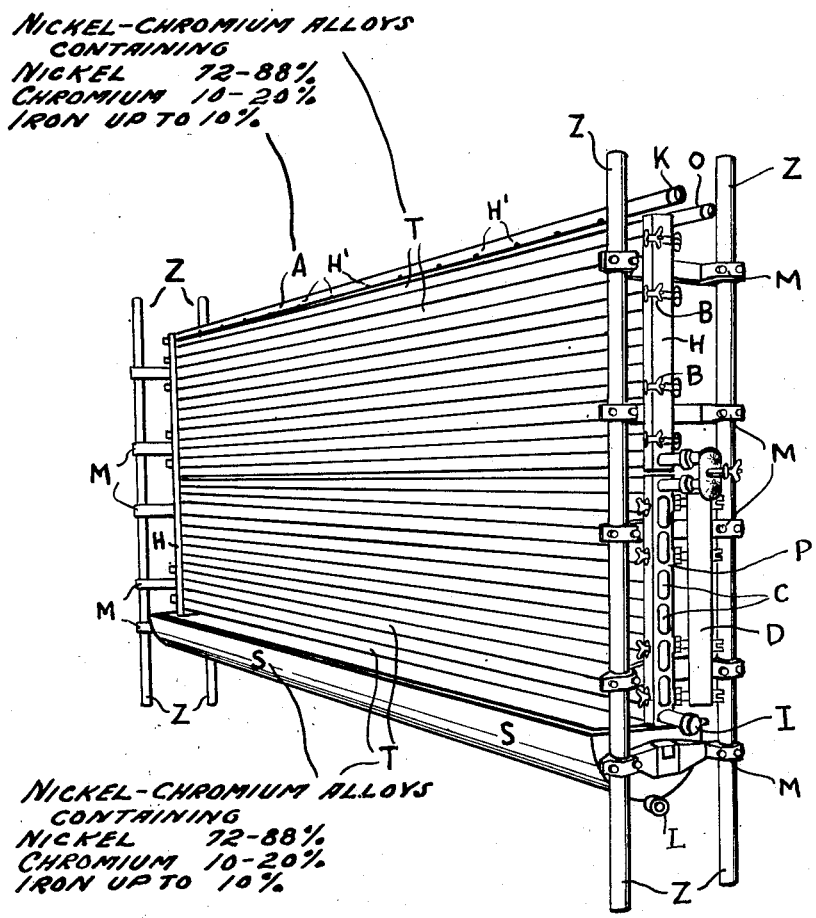

Sept. 1, 1936. P. D. MERICA 2,053,097
TARNISH RESISTANT, RUSTPROOF, AND NONCORRODIBLE DAIRY UTENSIL
Filed Jan. 9, 1934 2 Sheets-Sheet 1

INVENTOR
PAUL D. MERICA
BY
ATTORNEYS

Sept. 1, 1936. P. D. MERICA 2,053,097
TARNISH RESISTANT, RUSTPROOF, AND NONCORRODIBLE DAIRY UTENSIL
Filed Jan. 9, 1934 2 Sheets-Sheet 2
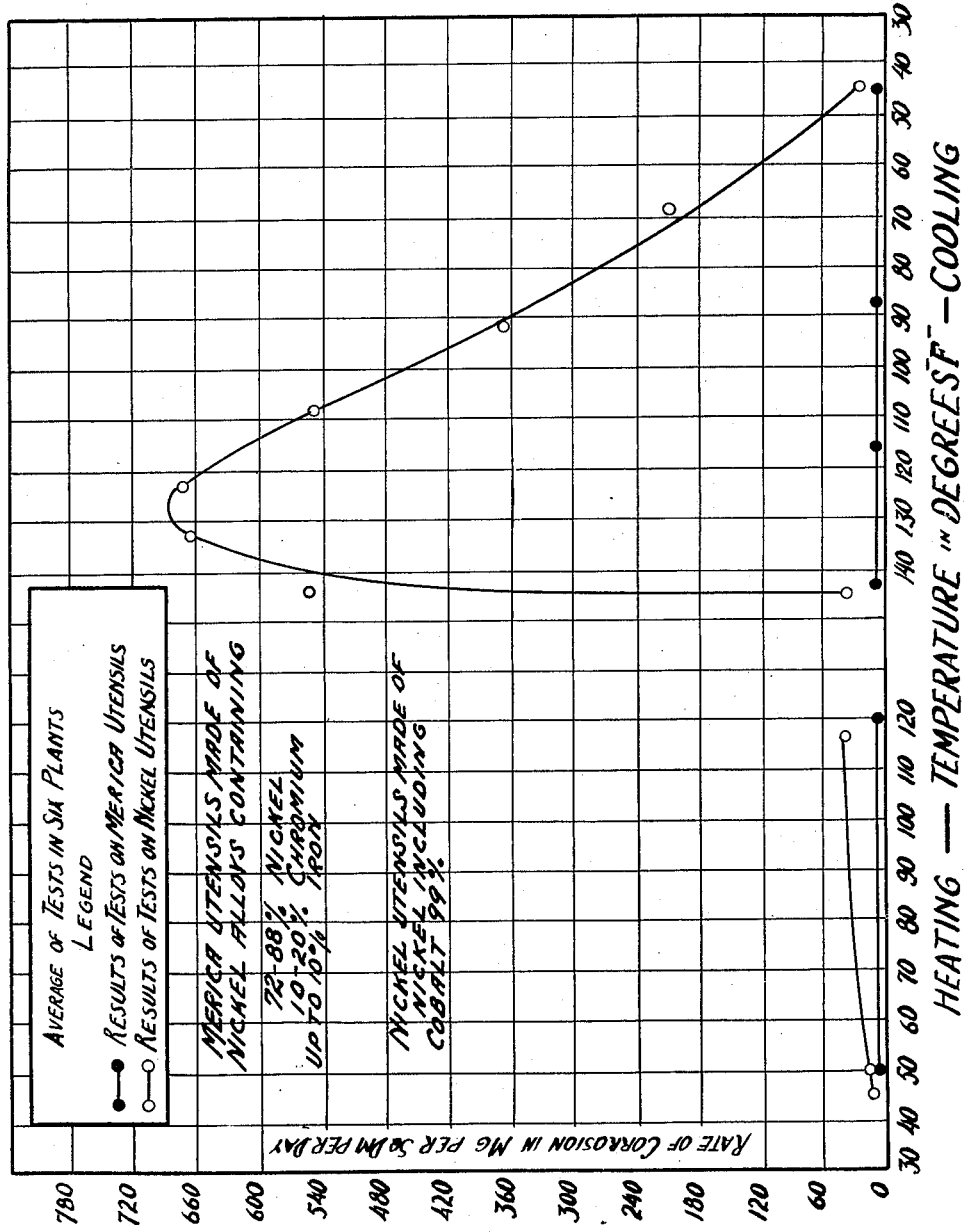
INVENTOR
PAUL D. MERICA
BY
Byrnes, Stebbins, Parmelee & Blenko
ATTORNEYS Patented Sept. 1, 1936

2,053,097

UNITED STATES PATENT OFFICE 2,053,097

TARNISH-RESISTANT, RUSTPROOF, AND NONCORRODIBLE DAIRY UTENSIL

Paul D. Merica, New York, N. Y., assignor to The International Nickel Company, Inc., New York, N. Y., a corporation of Delaware Application January 9, 1934, Serial No. 705,887

5 Claims. (Cl. 31—4)

The present invention relates to a tarnish resistant rustproof and noncorrodible dairy utensil and more particularly to a tarnish resistant, rustproof and noncorrodible cooler.

It is well known that in the dairy industry, milk and milk products have to be subjected to various operations of which the more important is pasteurization. Generally speaking, in a dairy the raw milk is held in a large storage tank. The temperature of the milk in the storage tank varies depending upon the seasons of the year and in summer may have a temperature as high as about 60° F. while in winter it may have a temperature as low as about 38° F. From the storage tank the milk flows to a regenerator cooler. The raw milk in flowing through the regenerator cooler cools the hot pasteurized milk which is flowing counter-current thereto. In the regenerator cooler the raw milk is warmed and the pasteurized milk is cooled. The warmed raw milk passes through a heater in which it is brought to pasteurizing temperatures (about 143° F. to about 145° F.). The heated raw milk is conducted to a holder in which the heated milk is held for a sufficient period of time at pasteurizing temperatures in order to effect pasteurization. From the holder the hot pasteurized milk flows through the regenerator cooler previously referred to. In the cooler the hot pasteurized milk is cooled from a temperature of about 140° F. or so to a temperature of about 60° F. or so. The cooled pasteurized milk has its temperature reduced still further by passing through or over a brine-cooled cooler or the like. The chilled or cold milk flows to mixers and then to bottle filling machines. Generally speaking, many pieces of equipment have been made of nickel. Thus, the regenerator cooler has been made of nickel. In this cooler it has been found that very curious phenomena of tarnishing and corrosion have occurred. Thus, milk cooling from about 140° F. to about 60° F. corroded the nickel cooler while milk which was heated through the same temperature range did not corrode the nickel cooler. Various efforts were made to overcome the difficulty and attempts were made to prevent the corrosion and failing of the coolers. Many proposals were made but none, as far as I am aware, was wholly satisfactory and successful for commercial operations on an industrial scale.

I have discovered a tarnish-resistant, rustproof and noncorrodible dairy utensil, especially a milk cooler, which is free from the disadvantages noted hereinabove and which is capable of functioning successfully and satisfactorily in commercial dairies operating under industrial conditions.

It is an object of the present invention to provide a tarnish-resistant, rustproof and noncorrodible milk cooler which is constituted of a special nickel-chromium-iron alloy and which can be manufactured economically under commercial conditions.

It is a further object of the invention to provide a tarnish-resistant, rustproof and noncorrodible dairy utensil which does not taint the milk or other food products under treatment, does not discolor them, does not impart undesirable tastes to them, does not render clear food products turbid and does not poison them.

It is also within the contemplation of the invention to provide a tarnish-resistant, rustproof and non-corrodible dairy utensil which is practical, durable and reliable, which is workable, and which is capable of being machined, brazed, soldered, welded and fabricated in the usual ways.

Moreover, the invention contemplates the provision of a tarnish-resistant, rustproof and non-corrodible dairy utensil which is smooth, bright and shiny, which is sanitary and which is capable of being readily cleansed and sterilized.

Other objects and advantages of the invention will become apparent from the following description taken in conjunction with the accompanying drawings in which:

Fig. 1 is a perspective view of a regenerator cooler embodying the present invention; and Fig. 2 shows comparative corrosion curves of the average of tests made with prior nickel coolers and with applicant's coolers to illustrate the superiority of the latter.

Referring more particularly to Fig. 1, the reference character T designates a plurality of superimposed tubes of a regenerator cooler. At the bottom of the bank of tubes an inlet I is provided for hot pasteurized milk, while an outlet O is provided at the top of the tubes for the outgoing cooled pasteurized milk. The tubes T are mounted in headers H in any well known manner. Thus, for instance, the tubes may be sweated in the headers. The ends of the pairs of the adjacent tubes are connected through a chamber C in the header. These chambers are separated from each other by partitions P. To enclose the end of the header a swinging door D is preferably provided. The door may be locked in position by means of a plurality of thumb screws and bolts B. Of course, if desired a gasket or collar may be interposed between the face of the header and the door. By this arrangement the tubes are connected together to form an elongated zigzag or serpentine path.

Mounted above tubes T is a distributor A which is illustrated in the form of a pipe with a plurality of holes H'. The raw milk is introduced into the distributor through an inlet port K and is discharged from the distributor via holes H' as a supply. This supply runs over the outer surface of tubes T. At the bottom of tubes T a trough S is provided to catch the raw milk. The collected milk is withdrawn from the trough through outlet port L.

For supporting the various members of the cooler a plurality of standards Z are provided there being preferably one at each of the four corners. Extending across the standards at each end of the cooler is a plurality of cross arms M which may be fastened to the various members of the coolers in any convenient manner. For instance, it has been found practical and satisfactory to bolt the cross arms to the standards and to the various members. Of course, any other mode of construction may be employed.

I have discovered that satisfactory results may be obtained when a dairy utensil, especially a regenerator cooler is constituted of a special nickel-chromium-iron alloy. Broadly stated, the ternary alloy is composed of about 72% to about 88% nickel, about 10 to 20% chromium, and up to about 8 or 9% iron. The ternary alloy preferably has a nickel content of about 75% to less than about 85%, the chromium content is about 12% to about 15%, and the iron content is about 5% to less than 10%. I have found it desirable to keep the carbon as low as possible but present in sufficient amount to give malleability and tenacity to the alloy. In practice, a carbon content of about 0.04% to about 0.15% has been found to give satisfactory results. In the event that the carbon content overruns the range no serious damage results. This freedom permits easier and cheaper production in the manufacture of the present ternary alloy and of utensils therefrom. On the other hand, in order to obtain full malleability together with freedom from corrosion and embrittlement in prior nickel-chromium-iron alloy utensils, a close and exact control of the carbon content is necessary. In practice, a ternary alloy containing about 77 or 78% of nickel, about 13% or 14% of chromium, about 6 or 7% of iron and about 0.08% of carbon can be rolled satisfactorily into sheets and can be drawn into tubes and can be cast into headers or the like. With sheets, tubing and castings of the foregoing ternary alloy, a regenerator cooler described hereinabove can be manufactured and fabricated in any of the usual ways. The regenerator cooler constituted of the foregoing ternary alloy does not become brittle under heating and cooling, resists tarnishing, rusting and corroding even under relatively high temperatures and keeps a polish even in the presence of corrosive media of the dairy and foodstuff industry.

A dairy or foodstuff utensil constituted of the following ternary alloy possessed satisfactory ductility for sheet drawing operations while still being resistant to tarnishing, rusting, and corrosion:

| | Per cent |
|---|---|
| Nickel | about 86.30 |
| Chromium | about 10.99 |
| Iron | about .82 |
| Carbon | about 0.11 |
| Miscellaneous | about 1.78 |

It was found that a ternary alloy having the following composition was substantially tarnish resistant, rustproof and noncorrodible and possessed good utility for rolling into sheets and for deep drawing in manufacturing various dairy and foodstuff utensils.

| | Per cent |
|---|---|
| Nickel | 77.80 |
| Iron | 0.52 |
| Chromium | 19.48 |
| Carbon | 0.06 |
| Miscellaneous | 2.14 |

A further illustrative example of a foodstuff utensil is a ternary alloy constituted of nickel, chromium and iron and having the following composition:

| | Per cent |
|---|---|
| Iron | about 8.0 |
| Chromium | about 20.00 |
| Nickel (principally balance) | about 72.00 |

The alloys may be readily hot-worked, rolled or forged. In order to render them more readily forgeable, it is preferred that they should be deoxidized in the molten condition in any suitable manner, as by the use of silicon and manganese, using enough of each to allow the metal to retain from .05% to 1.0% of silicon and from 0.10% to 3.0% of manganese. In addition, it is important to add just before pouring ingots either aluminum, magnesium, lithium or calcium, preferably the latter, in accordance with the process described in the copending application, Serial Number 223,233, filed September 30, 1927 and issued as United States Patent No. 1,824,966, dated September 29, 1931. Generally, from between .03% and .15% of calcium is sufficient to malleableize the metal. The alloys may then be hot- and cold-worked by the usual methods.

Summarizing, it has been found that the present ternary alloys composed of nickel, chromium and iron, together with certain other constituents mentioned above, resist tarnish, rust and corrosion, and in addition are readily hot-worked, sheet-rolled, polished, drawn, stamped, and subjected to other modes of metal working or of fabrication. For instance, the present utensil is formed somewhat more easily than prior utensils made of austenitic nickel-chromium steels because the former do not spring back as much as the latter after being bent. Then again, it has been found by actual welding experiment on the present utensil that it is unnecessary to heat-treat the weld, or to control the carbon content within a narrow range, or to add expensive addition agents to the welding rod or utensil or the alloy constituting the utensil. Welds made without such control have been demonstrated to have suitable physical properties and corrosion resistance after they have been made. Moreover, due to the higher nickel content, the present foodstuff utensil is easier to braze or solder than prior nickel-chromium-iron alloy utensils. The dairy and food utensils are of complicated shapes and must be so made as to be free from cracks or sharp corners which might enclose dirt. The capability of applicant's alloy of being brazed and soldered enables more perfect manufacture of the present utensils than prior utensils made of low-nickel ternary alloys of nickel, chromium and iron.

It has been found by a comprehensive series of comparative tests that the present cooler of a special nickel-chromium-iron alloy is far superior to prior coolers made of nickel. If reference is made to Fig. 2, it will be noted that the corrosion rate of prior nickel coolers increased as the temperature increased from about 40 or 50° F. upwards and that the corrosion rate increased enormously during the cooling of the milk from about 140° F. From about 135° F. to 125° F. the corrosion rate is highest for the nickel cooler when in contact with cooling milk. In sharp contrast with the foregoing curves for prior nickel coolers, it will be observed that the curves for the present improved cooler of special nickel-chromium-iron alloy is practically a straight line which is close to a zero rate of corrosion. The corrosion rates are given in milligrams per square decimeter per day of 24 hours. If the highest corrosion rate of the prior nickel coolers is compared with the highest corrosion rate of the present improved cooler of the special nickel-chromium-iron alloy, it will be observed that the prior cooler has a rate which is 70,000% greater than that of the present cooler. This superiority of the improved cooler is so great and the results are so unique that it would have been impossible to make any prediction from a priori reasoning. As a matter of fact, the expert metallurgists and chemists skilled in the art have been unable to predict the kind and amount of corrosion and rusting to which an alloy or metal would be subjected under certain conditions even when data and information were available on similar metals and alloys. In this connection, tests which were carried out with the present improved dairy utensils showed unusual galvanic behavior. It was found that the special nickel-chromium-iron alloy in an electrolytic cell with nickel as the other electrode and milk as the bath gave a potential of 86 millivolts and an electrolytic cell of copper and nickel in a milk bath gave a potential of 62 millivolts, whereas ten times the current in milliamperes flowed in the latter cell than in the former cell. These results astonished the experts in the art. This test shows the curious and unusual galvanic behavior of the improved foodstuff utensil and shows that the superior, unexpected and anomalous properties were beyond prediction.

In carrying the present invention into practice, it has been found by actual tests in the dairy industry that the present utensils can be used in conjunction with existing equipment, especially that made of aluminum, without electrolytic action being set up. This is of great importance because in most dairies various metals and alloys are used for different pieces of equipment. In one instance aluminum paddles used in a vat pasteurizer lined with nickel were found to corrode at an abnormal rate. The actual current flowing between one of these paddles and the nickel pasteurizer when filled with milk at 145° F. was found to be about 400 milliamperes when the paddle was at rest. The resistance of the circuit was found to be about 0.021 ohm.

The open circuit potential between the nickel pasteurizer and the aluminum paddles in fully aerated milk at 145° F. after the circuit had been closed for some time, was found to be about 500 millivolts.

In a laboratory test it was found that coupling aluminum and nickel specimens of equal area in fully aerated milk at 130° F. resulted in increasing the rate of corrosion of aluminum some 20 times. In contrast to the foregoing it has been found by laboratory tests that the special nickel-chromium-iron alloy constituting the present foodstuff utensil has the important and useful property of not accelerating seriously the corrosion of other metals coupled with it in sweet milk at pasteurizing temperatures. This is illustrated by the fact that coupling aluminum with the present nickel-chromium-iron alloy only resulted in increasing the corrosion of aluminum 2.5 times as compared with twenty times as noted hereinabove. It was also found that the present ternary alloy was without important effect on the corrosion of copper, nickel, and stainless steel (18% chromium, 8% nickel and balance principally iron) under the same conditions. As those skilled in the art know, it is essential that new utensils should not have a detrimental effect on existing equipment in a dairy and cause corrosion thereof by the setting up of destructive electrolytic action. The improved utensil has been found to satisfy this essential condition and has been successfully installed and satisfactorily used in dairies in connection with existing equipment made of other metals and alloys.

Among other equipment for the dairy industry, it is to be noted that the present invention can be embodied in surface coolers, internal coolers, ice cream hoppers, ice cream conveyer tubes, fore-warmers, ripeners, pasteurizers, storage tanks, holding tanks, heaters, pipe lines and the like. The fact that the present dairy utensil has been successfully used as an internal cooler has been of great importance to the industry. In an internal cooler, milk flows through the internal pipe and brine flows through the space between the outside of the internal pipe and the inside of the jacketing pipe. It will thus be observed that the internal pipe is subjected to the action of the cooling milk on the interior thereof and is subjected to the action of brine on the exterior thereof. Tests which were made on brine corrosion showed that the corrosion was not only very small but also that the joints (riveted, soldered, brazed, seam-welded, etc.) were free from internal deterioration and less subject to attack than the parent metal. The following table shows the results obtained with several nickel-chromium-iron alloys constituting the improved dairy utensil. In these tests specimens were subjected to the action of 16% calcium chloride refrigerating brine having a pH of about 5 for a period of 100 days.

| Alloy | Over-all corrosion, inches |
|---|---|
| 80% Ni, 8% Cr, 2% Fe | 0.00043 |
| 80% Ni, 13% Cr, 6% Fe | 0.00046 |
| 79% Ni, 20% Cr, 0.2% Fe | 0.00049 |

The foregoing figures show that the corrosion is practically negligible for practical purposes and that the results of actual installations have been satisfactory and have been free from tarnishing, rusting, and corroding. In connection with refrigerating brines, comparative tests have demonstrated that less deterioration by pitting by brines has occurred with the present improved dairy utensil than with prior nickel-chromium-iron-alloy utensils.

The resistance of welds to this corrosion is of importance. As a matter of actual measurement it was determined that in tests where the average penetration in the sheets was .006" in 100 days, the penetration in the weld itself was only .004" in 100 days.

Tests on sodium chloride brines gave relative results much in line with the above but penetration rates somewhat lower.

An accelerated test has been made by subjecting welded specimens to a solution of copper sulphate and sulphuric acid as used widely for testing the embrittlement susceptibility of metals. After about 100 hours the special nickel-chromium-iron alloy constituting the present foodstuff utensil had lost none of its ductility. During this same period of time a metal susceptible to embrittlement had suffered serious crystalline attack.

In tests carried out with sweet milk the temperatures from about 144° F. to about 147° F. with nickel utensils and the present utensils, it was demonstrated that the present utensils were far superior and the rates of corrosion were practically nil on specimens of the present utensils. The sweet milk was fully aerated and the specimens were moved at about a velocity of about 16 ft. per minute. The rates of corrosion are given in milligrams of weight lost per square decimeter per day of twenty-four hours.

| Test No. | Temperature in ° F. | Rates of corrosion of nickel in mg./dm.²/day | Rates of corrosion of specimens of present utensil in mg./dm.²/day |
|---|---|---|---|
| A | 145 | 525 | 0 |
| B | 145 | 526 | 0 |
| C | 145 | 500 | 0 |
| D | 147 | 525 | 0 |
| E | 147 | 540 | 0 |
| F | 143 | 502 | 0 |
| Grand Average | | 520 | 0 |

Comparative tests were also carried out with fully aerated butter milk at about 140° F. to about 165° F. In these tests the specimens were not moved. The following table gives the results:

| Experiment No. | Corrosion of nickel in mg./dm.²/day | Corrosion of specimens in mg./sq.dm.²/day |
|---|---|---|
| A | 110 | 0 |
| B | 109 | 0 |
| Average | 110 | 0 |

Spot tests have been made by placing food products on the clean metal surface and allowing to stand for long periods. Containers have been made up and cooking operations carried out in the laboratory, home, and factory. These tests have furnished definite data on some 30 different common conditions of food handling selected as conditions which may affect metals or enamels. None of these tests have shown visible tinting or other significant attack.

The physical and mechanical properties of the ternary alloy constituting the present improved utensil are as follows:—

Physical constants

| | |
|---|---|
| Density | 8.55 |
| Co-efficient of expansion | |
| 100°–200° F. range | |
| Per ° F | .0000064 |
| Per ° C | .0000115 |
| 100–1400° F. range | |
| Per ° F | .00000896 |
| Per ° C | .0000161 |
| Heat conductivity | 3.5% that of copper |
| Specific heat (77°–212° F.) | 109 |
| Melting point | |
| ° F | 2,540 |
| ° C | 1,388 |
| Modulus of elasticity | |
| Lbs./in.² | 31,000,000 |

Mechanical properties

| | Tensile strength lbs./in.² | Yield point lbs./in.² | Elongation, percent | Reduction in area, percent |
|---|---|---|---|---|
| Sheet and strip: | | | | |
| Annealed | 80–95,000 | 30–40,000 | 45–55 | |
| Rod: | | | | |
| Annealed | 80–95,000 | 30–40,000 | 45–55 | 65–75 |
| Cold-Drawn | 100–115,000 | 80–95,000 | 20–30 | |
| Wire: | | | | |
| Annealed | 80–95,000 | 30–40,000 | 45–55 | |
| Spring-temper | 175–200,000 | | | |

It is to be observed that the present invention provides a foodstuff utensil which is highly useful to the foodstuff industry, particularly the dairy industry. Some of the more important properties and features of the present improved foodstuff utensil will be given. The metallurgical features and properties possessed by the present foodstuff utensil are that it is tarnish-resistant, rustproof, noncorrodible, workable and capable of being fabricated. The chemical features and properties of the improved foodstuff utensil are freedom from discoloring foods, freedom from imparting undesirable tastes to foods, freedom from rendering foodstuffs turbid, freedom from tainting foods, especially milk, and freedom from poisoning foods. The general properties and features are that the utensil is practical and economical, that it is reliable and durable, and workable, that it is capable of being machined, brazed, soldered, welded, etc. and of being fabricated, that it is smooth, bright and shiny, that it is capable of being cleansed and sterilized, and that it is sanitary.

It is also to be noted that the present foodstuff utensil is not to be confused with prior utensils, especially those made of other nickel-chromium-iron alloys. It has been found that prior utensils of the foregoing alloys, particularly those high in iron, discolored foodstuffs containing tannin. This was especially noted in tests on wines, in which the wines were sometimes discolored so badly as to be unfit for use. It was likewise found that certain wines were rendered turbid. In contradistinction to the failure of prior utensils the present foodstuff utensil has been highly successful and has been contacted with wines, foodstuffs containing tannin, etc. without tarnishing, rusting or corroding or without detrimentally affecting the foodstuff in any way.

Furthermore, the present invention provides a dairy or foodstuff utensil which can be used in galvanic contact with equipment and apparatus made of other metals and alloys without inducing galvanic corrosion to either. Dairy utensils, especially regenerator coolers can be made partly of other metals and alloys and partly of the ternary alloy referred to herein.

The present application is a continuation in part of my co-pending application Serial No. 223,243, filed September 30, 1927.

I claim:

1. As an article of manufacture, a tarnish resistant, noncorrodible, readily workable, durable and sanitary dairy cooler constituted of structural elements subject to the action of cooling brine on one side and to the action of warm milk undergoing cooling on the other side and resistant to cooling brine and to dairy products composed of a high nickel ternary alloy comprising about 72% to about 88% nickel, about 10% to about 20% chromium, iron not exceeding about 10% and a relatively low content of carbon.

2. As an article of manufacture, a tarnish resistant, noncorrodible, readily workable, durable and sanitary dairy cooler constituted of structural elements subject to the action of flowing cooling brine on one side and to the action of flowing warm milk undergoing cooling on the other side and resistant to cooling brines and to dairy products composed of a high nickel ternary alloy comprising about 72% to about 88% nickel, about 10% to about 20% chromium, iron not exceeding about 10%, and about 0.04% to about 0.15% carbon.

3. As an article of manufacture, a tarnish resistant, noncorrodible, readily workable, durable and sanitary dairy cooler constituted of structural elements subject to the action of flowing cooling brine on one side and to the action of flowing warm milk undergoing cooling on the other side and resistant to cooling brines and to dairy products composed of a high nickel ternary alloy comprising about 75% to about 85% nickel, about 12% to about 15% chromium, about 5% to not exceeding about 10% iron, and a relatively low content of carbon.

4. As an article of manufacture, a tarnish resistant, noncorrodible, readily workable, durable and sanitary dairy cooler constituted of structural elements subject to the action of flowing cooling brine on the exterior thereof and to the action of flowing warm milk undergoing cooling on the interior thereof and resistant to cooling brines and to dairy products composed of a high nickel ternary alloy comprising about 77% to about 80% nickel, about 13% to about 14% chromium, about 6% to about 7% iron, and a relatively low content of carbon.

5. As an article of manufacture, a tarnish resistant, noncorrodible, readily workable, durable and sanitary dairy cooler constituted of structural elements subject to the action of flowing cooling brine on the exterior thereof and to the action of flowing warm milk undergoing cooling on the interior thereof and resistant to cooling brines and to dairy products composed of a high nickel ternary alloy comprising about 77% to about 80% nickel, about 13% to about 14% chromium, about 6% to about 7% iron, and about 0.08% carbon.

PAUL D. MERICA.